United States Patent [19]
Kowitz et al.

[11] Patent Number: 6,120,895
[45] Date of Patent: Sep. 19, 2000

[54] BIODEGRADABLE POLYESTERS

[75] Inventors: Christoph Kowitz, Weinheim; Peter Bauer, Ludwigshafen; Dieter Bernhard Beimborn, Weisenheim; Bernd Bruchmann, Freinsheim; Uwe Faller, Frankenthal; Martin Laun; Udo Pagga, both of Ludwigshafen; Gunter Pipper, Bad Dürkheim; Volker Warzelhan, Weisenheim, all of Germany

[73] Assignee: BASF Aktiengesellschaft, Ludwigshaften, Germany

[21] Appl. No.: 09/254,922

[22] PCT Filed: Sep. 19, 1997

[86] PCT No.: PCT/EP97/04908

§ 371 Date: Mar. 17, 1999

§ 102(e) Date: Mar. 17, 1999

[87] PCT Pub. No.: WO98/12242

PCT Pub. Date: Mar. 20, 1998

[30] Foreign Application Priority Data

Sep. 20, 1996 [DE] Germany ................ 196 38 488

[51] Int. Cl.$^7$ .............. D02G 3/00; C08F 20/00; C08G 63/02
[52] U.S. Cl. .............. 428/364; 528/80; 528/81; 528/83; 528/272; 528/288; 528/289; 528/300; 528/301; 528/302; 528/306; 528/307; 528/308; 528/308.6; 525/437; 525/440
[58] Field of Search .................. 528/272, 288, 528/289, 298, 300, 301, 302, 306, 307, 308, 308.6, 80, 81, 83; 525/437, 440; 428/364

[56] References Cited

U.S. PATENT DOCUMENTS 2,999,851  9/1961  Elmer ........................... 260/75
3,553,157  1/1971  Dijkstra et al. ................ 260/40
3,804,810  4/1974  Fryd ............................ 260/75
5,446,079  8/1995  Buchanan et al. .............. 524/41
5,484,861  1/1996  Ihm et al. ..................... 525/450

FOREIGN PATENT DOCUMENTS 572256    12/1993  European Pat. Off. .
4440836    5/1996  Germany .
4440858    5/1996  Germany .
89/11497  11/1989  WIPO .

*Primary Examiner*—Samuel A. Acquah
*Attorney, Agent, or Firm*—Keil & Weinkauf

[57] ABSTRACT

Biodegradable polyesters based on

A) 95–99.99 mol % of at least one polyester A containing as monomeric building blocks of an acid component comprising $a_{11}$) 20–95 mol % of at least one aliphatic or cycloaliphatic dicarboxylic acid or its ester-forming derivative and $a_{12}$) 5–80 mol % of at least one aromatic dicarboxylic acid or its ester-forming derivative and at least one dihydroxy compound or at least one amino alcohol or their mixtures, and B) 0.01–5 mol % of a mixture comprising mono-, bi-, tri-, tetra- and higher-nuclear isocyanurates or corresponding compounds containing two, three or four functional groups capable of reacting with the end groups of polyester A, or mixtures of the isocyanurates and the corresponding compounds, as well as molding compositions comprising said polyesters, their manufacture and their use in the manufacture of moldings, filsm, fibers and coatings.

9 Claims, No Drawings

BIODEGRADABLE POLYESTERS

DESCRIPTION

The present invention relates to biodegradable polyesters obtainable from

A) 95–99.99 mol % of at least one polyester containing as monomeric building blocks
   - $a_1$) a mixture of
     - $a_{11}$) 20–95 mol % of at least one aliphatic or cycloaliphatic dicarboxylic acid or its ester-forming derivative and
     - $a_{12}$) 5–80 mol % of at least one aromatic dicarboxylic acid or its ester-forming derivative and
   - $a_2$) at least one dihydroxy compound or at least one amino alcohol or their mixtures and B) 0.01–5 mol % of a mixture comprising
   - $b_1$) 45–80% by weight of at least one mononuclear isocyanurate ($b_{11}$) or at least one compound ($b_{12}$) which contains two functional groups capable of reacting with the end groups of polyester A or mixtures of $b_{11}$ and $b_{12}$,
   - $b_2$) 13–25% by weight of at least one binuclear isocyanurate ($b_{21}$) or at least one compound ($b_{22}$) which contains three functional groups capable of reacting with the end groups of polyester A or mixtures of $b_{21}$ and $b_{22}$,
   - $b_3$) 5–12% by weight of at least one trinuclear isocyanurate ($b_{31}$) or at least one compound ($b_{32}$) which contains four functional groups capable of reaction with the end groups of polyester A or mixtures of $b_{31}$ and $b_{32}$ and
   - $b_4$) 2–18% by weight of at least one tetra- or higher-nuclear isocyanurate ($b_{41}$) or mixtures of different isocyanurates ($b_{41}$).

The present invention furthermore relates to molding compositions which comprise the biodegradable polyesters, to processes for preparing the biodegradable polyesters and to their use for producing moldings, films or fibers. The invention furthermore relates to the moldings, films or fibers produced using the biodegradable polyesters.

Biodegradable polyesters which comprise repeating units derived from a mixture of aromatic and aliphatic dicarboxylic acids or their derivatives are disclosed, for example, in U.S. Pat. No. 5,446,079. This describes linear, random, semicrystalline polyesters having an intrinsic viscosity of about 0.5–1.8 dl/g (measured in phenol/tetrachloroethane, 60/40 ratio by weight, at a concentration of 0.5 g/100 ml and at 25° C.), the dicarboxylic acid mixture comprising from 5 to 65 mol % of aliphatic and from 35 to 95 mol % of aromatic dicarboxylic acids.

Chain-extended or branched polyesters are likewise known. Also known are polyesters which are both branched and chain-extended. Diisocyanates are frequently used to extend the chains, and polyfunctional acids and/or alcohols are often employed as branching agents. Isocyanates of higher functionality, polyisocyanates, are generally used as crosslinkers. In order to produce moldings with thick walls, U.S. Pat. No. 3,553,157 recommends drum application of polyisocyanates before processing onto polyethylene terephthalate (PET) so that the PET crosslinks during processing. The molded articles produced in this way are, however, not free of specks; the surface quality is thus unsatisfactory. U.S. Pat. No. 2,999,851 describes, for example, linear polyesters which are chain-extended with diisocyanates and can be crosslinked with polyisocyanates. Polyesters modified in this way are, in particular, easily ground. However, they are not amenable to melt processing, nor are they suitable for preparing polymer blends. WO 89/11497 discloses polyesters from cycloaliphatic and aromatic monomers, which are branched in a first step and reacted with polyisocyanates in another step. These polyesters can be processed to films. A disadvantage is, however, that these polyesters are not thermoplastic. The films must therefore be produced by rolling. Production of satisfactory films by blow molding is not possible with these polyesters. Adhesives made from aliphatic/aromatic polyesters chain-extended with diisocyanates and crosslinked with polyisocyanates are disclosed in U.S. Pat. No. 3,804,810.

EP-A1-572 682 discloses that biodegradable films can be obtained from aliphatic polyesters which have, for example, been branched with pyromellitic dianhydride and chain-extended with polyisocyanates. Aliphatic/aromatic polyesters chain-extended with diisocyanates and capable of biodegradation are disclosed in DE-A1-44 40 858.

The biodegradable polyesters disclosed to date do not yet meet all requirements, in particular for producing films. In addition, the aliphatic polyesters show, although chain-extended and branched, a tendency to stick. Furthermore, they have the disadvantage that their melting points are too low and thus they have inadequate heat resistance. It is true that succinic acid can be employed to raise the melting points. However, this dicarboxylic acid is too costly for mass production. The linear, aliphatic/aromatic polyesters chain-extended with diisocyanates can be processed to films better than the corresponding ones without chain extension. On the other hand, they form gel particles which interfere with processing, especially when the cycle times are long.

It is an object of the present invention to develop biodegradable aromatic/aliphatic polyesters which can be processed to films, which are not sticky and which have good surface quality. Furthermore, aromatic/aliphatic polyesters shall be provided whose mechanical properties resemble polyesters having a high proportion of aromatic units, but whose degradability is similar to that of polyesters having high proportions of aliphatic units. It was particularly intended that the novel polyesters make it possible for the cycle times to be long or very long during processing, also in the production of moldings, for example by injection molding.

It was furthermore intended to find a material which can be processed to biodegradable filaments. It was furthermore intended to make available biodegradable polyesters which can be processed with other materials, especially those which are themselves biodegradable, to molding compositions.

We have found that this object is acheived by the polyesters mentioned at the outset.

The term "biodegradable" as used within the scope of the present application refers to the fact that the polyesters decompose under environmental influences in an appropriate and demonstrable timespan. This degradation usually takes place by hydrolysis and/or oxidation, but mainly by the action of microorganisms such as bacteria, yeasts, fungi and algae. However, enzymatic degradation is also possible, as described, for example, by Y. Tokiwa and T. Suzuki in "Nature" 270 (1977) 76–78. It is moreover possible within the scope of the present invention to alter the rate of biodegradation, ie. the time taken for the polyesters according to the invention to be essentially completely degraded, by the appropriate choice of the ratio between repeating units derived from aliphatic carboxylic acids or their ester-forming derivatives and those derived from aromatic carboxylic acids or their ester-forming derivatives. The rule of thumb applying to this is that the rate of biodegradation of the polyesters increases with the content of repeating units derived from aliphatic carboxylic acids or their ester-forming derivatives. Furthermore, the rate of biodegradation of the polyesters increases with the content of sections with an alternating sequence of repeating units derived from aliphatic and aromatic carboxylic acids or their ester-forming derivatives.

Polyester A

According to the invention, the polyesters A comprise a mixture $a_1$ of the dicarboxylic acids $a_{11}$ and $a_{12}$ and dihydroxy compounds $a_2$.

The aliphatic dicarboxylic acids $a_{11}$ suitable according to the invention for preparing polyesters A generally have 2 to 10 carbon atoms, preferably 4 to 6 carbon atoms. They may be either linear or branched. The cycloaliphatic dicarboxylic acids $a_{11}$ which can be used for the purpose of the present invention are, as a rule, those having 7 to 10 carbon atoms and, in particular, those having 8 carbon atoms. It is also possible in principle, however, to employ dicarboxylic acids $a_{11}$ having a larger number of carbon atoms, for example up to 30 carbon atoms.

Examples which may be mentioned are: malonic acid, succinic acid, glutaric acid, adipic acid, pimelic acid, azelaic acid, sebacic acid, fumaric acid, 2,2-dimethylglutaric acid, suberic acid, 1,3-cyclopentanedicarboxylic acid, 1,4-cyclohexanedicarboxylic acid, 1,3-cyclohexanedicarboxylic acid, diglycolic acid, itaconic acid, maleic acid and 2,5-norbornanedicarboxylic acid, of which adipic acid or sebacic acid is preferred.

Ester-forming derivatives of the abovementioned aliphatic or cycloaliphatic dicarboxylic acids all which should be particularly mentioned are the di-$C_1$-$C_6$-alkyl esters such as dimethyl, diethyl, di-n-propyl, diisopropyl, di-n-butyl, diisobutyl, di-t-butyl, di-n-pentyl, diisopentyl or di-n-hexyl esters. It is likewise possible to employ anhydrides of the dicarboxylic acids $a_{11}$.

It is moreover possible to employ the dicarboxylic acids or their ester-forming derivatives $a_{11}$ singly or as mixture of two or more thereof.

Preferably employed are adipic acid or its ester-forming derivatives alone or sebacic acid or its ester-forming derivatives alone or mixtures of adipic acid and sebacic acid or their ester-forming derivatives, especially adipic acid or its ester-forming derivatives alone.

The content of aliphatic or cycloaliphatic dicarboxylic acid or its ester-forming derivatives $a_{11}$ is, according to the invention, from 20 to 95, preferably from 30 to 70, particularly preferably from 40 to 65, in particular from 50 to 60, mol %, in each case based on the total amount of components $a_{11}$ and $a_{12}$.

Aromatic dicarboxylic acids $a_{12}$ which should generally be mentioned are those having 8 to 12 carbon atoms and, preferably, those having 8 carbon atoms. Examples which may be mentioned are terephthalic acid, isophthalic acid, 2,6-naphthalic acid and 1,5-naphthalic acid, and ester-forming derivatives thereof. Particular mention should be made in this connection of the di-$C_1$-$C_6$-alkyl esters, eg. dimethyl, diethyl, di-n-propyl, diisopropyl, di-n-butyl, diisobutyl, di-t-butyl, di-n-pentyl, diisopentyl or di-n-hexyl ester. The anhydrides of the dicarboxylic acids $a_{12}$ are likewise suitable ester-forming derivatives. Here preference is given to terephthalic acid or its ester-forming derivatives, especially to the dimethyl ester, or mixtures thereof.

However, it is also possible in principle to employ aromatic dicarboxylic acids $a_{12}$ having a larger number of carbon atoms, for example up to 20 carbon atoms.

The aromatic dicarboxylic acids or their ester-forming derivatives $a_{12}$ can be employed singly or as mixture of two or more thereof.

The content of aromatic dicarboxylic acids or their ester-forming derivatives $a_{12}$ is, according to the invention, from 5 to 80, preferably from 30 to 70, particularly preferably from 35 to 60, in particular from 40 to 50, mol %, in each case based on the total amount of components $a_{11}$ and $a_{12}$.

Employed as component $a_2$ according to the invention is at least one dihydroxy compound or at least one amino alcohol or mixtures thereof. It is possible in principle to use all diols or amino alcohols able to form esters with the dicarboxylic acids $a_{11}$ or $a_{l2}$.

However, in general, branched or linear alkanediols having 2 to 12 carbon atoms, preferably 4 to 6 carbon atoms, or cycloalkanediols having 5 to 10 carbon atoms, $a_{22}$ polyetherdiols, ie. dihydroxy compounds containing ether groups, or amino alcohols having 2 to 12 carbon atoms, preferably 2 to 4 carbon atoms, and cyclic amino alcohols having 5 to 10 carbon atoms, are employed as component $a_2$.

Examples of suitable alkanediols are ethylene glycol, 1,2-propanediol, 1,3-propanediol, 1,2-butanediol, 1,4-butanediol, 1,5-pentanediol, 2,4-dimethyl-2-ethyl-1,3-hexanediol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, in particular ethylene glycol, 1,3-propanediol, 1,4-butanediol or 2,2-dimethyl-1,3-propanediol (neopentyl glycol); cyclopentanediol, 1,4-cyclohexanediol, 1,2-cyclohexanedimethanol, 1,3-cyclohexanedimethanol, 1,4-cyclohexanedimethanol or 2,2, 4,4-tetramethyl-1,3-cyclobutanediol. It is also possible to use mixtures of different alkanediols.

Examples of polyetherdiols are diethylene glycol, triethylene glycol, polyethylene glycol, polypropylene glycol, polytetrahydrofuran, especially diethylene glycol, triethylene glycol, polyethylene glycol, or mixtures thereof, or compounds having a different number of ether units, for example polyethylene glycol containing propylene units and obtainable, for example, by polymerizing, by conventional methods, first ethylene oxide and then propylene oxide. The molecular weight (Mn) of the polyethylene glycols which can be employed is, as a rule, from about 250 to about 8000, preferably from about 600 to about 3000, g/mol. Mixtures of different polyetherdiols can likewise be used. 4-Aminomethylcyclohexanemethanol, 2-aminoethanol, 3-aminopropanol, 4-aminobutanol, 5-aminopentanol, 6-aminohexanol; aminocyclopentanol and aminocyclohexanol, or mixtures thereof, are examples of amino alcohols which can be employed as component $a_2$. Mixtures of different amino alcohols can likewise be employed.

The molar ratio of $a_1$ to $a_2$ is generally chosen in the range from 0.4:1 to 2.5:1, preferably in the range from 0.5:1 to 1.5:1, furthermore preferably in the range from 0.5:1 to 1.2:1 and, in particular, in the range from 0.8:1 to 1.1:1.

Preferred polyesters A contain the monomeric building blocks $a_1$ and $a_2$. The molar ratio of $a_1$ and $a_2$ in the isolated polyester A is, after removal of the required amount of excess component $a_2$, generally approximately 0.8:1 to about 1:1, preferably within the range from 0.9 to 1:1, particularly preferably within the range from 0.95 to 1:1. The polyesters A preferably contain hydroxyl and/or amino end groups, ie., $a_1$:$a_2$ is somewhat less than 1.

In general, polyester A is essentially linear and its weight average molecular weight Mw is generally within the range from 5000 to 120,000 g/mol, preferably within the range from 20,000 to 80,000 g/mol, determined by gel permeation chromatography using polystyrene standards with narrow distributions in tetrahydrofuran as solvent. The polydispersity (PDI=$M_w/M_n$) of polyesters A is generally within the range from 2 to 4, preferably within the range from 2.5 to 3.5.

Component B

Mixture B of the invention comprises a component $b_1$ in proportions from 45 to 80, preferably from 50 to 75, for example from 55 to 70, % by weight, based on the total weight of mixture B. Mixture B of the invention further comprises from 13 to 25, preferably from 15 to 23, especially from 16 to 20, % by weight, based on the total weight of mixture B, of a component $b_2$. Component $b_3$ is present in mixture B in a proportion from 5 to 12, preferably from 5 to 11, % by weight, based on the total weight of mixture B. For example, B may comprise from 6 to 10% by weight, based on the total weight of mixture B, of $b_3$. As well as components $b_1$ and $b_3$, mixture B comprises from 2 to 18, preferably from 5 to 16, % by weight, based on the total weight of mixture B, of component $b_4$. In a preferred embodiment, B comprises from 8 to 15% by weight, based on the total weight of mixture B, of component $b_4$.

Components $b_1$ to $b_4$ are each composed of at least one isocyanurate or at least one compound having groups which are reactive with the end groups of polyester A, or mixtures thereof. Components $b_1$ to $b_4$ differ in that the isocyanurates $b_{11}$ to $b_{41}$ have a differing number of nuclei which indicates the number of cyanurate rings in the molecule. According to the invention, component $b_1$ may comprise mononuclear isocyanurates, $b_2$ may comprise binuclear isocyanurates, $b_3$ may comprise trinuclear isocyanurates and $b_4$ may comprise tetra- or higher-nuclear isocyanurates. Said isocyanurates $b_{11}$ to $b_{41}$ can have the same basic structure in all components $b_1$ to $b_4$. However, the isocyanurates in components $b_1$ to $b_4$ can also have different basic structures independently of one another. $B_1$ to $b_4$ further differ in the number of functional groups in the reactive compounds $b_{12}$ to $b_{42}$. The basic molecule of this compound can be identical in the four components $b_1$ to $b_4$ or independently different from one another.

In a preferred embodiment, the isocyanurates $b_{11}$ to $b_{41}$ are used alone in components $b_1$ to $b_4$. The preferred isocyanurates include the aliphatic isocyanurates, such as isocyanurates derived from alkylene diisocyanates or cycloalkylene diisocyanates having from 2 to 20 carbon atoms, preferably from 3 to 12 carbon atoms, eg. isophorone diisocyanate. The alkylene diisocyanates can be not only linear but also branched. Particular preference is given to diisocyanurates which are based on n-hexamethylene diisocyanate.

As component B, however, it is also possible to use mixtures comprising difunctional, trifunctional and tetrafunctional epoxides $b_{12}$ to $b_{32}$. Bisphenol A diglycidyl ether is an example of a suitable difunctional epoxide. Suitable trifunctional epoxides include 1,3,5-trisoxiranylmethyl[1.3.5]triazinane-2,4,6-trioxane, 2,4,6-trisoxiranyl[1.3.5]trioxane, trisoxiranylmethyl benzene-1,3,5-tricarboxylate or 1,1,1-tris(hydroxymethyl)ethane tris (glycidyl ether), 1,1,1-tris(hydroxymethyl)propane tris (glycidyl ether). 4,4'-Methylenebis[N,N-bis(2,3-epoxypropyl)aniline] or pentaerythritol tetraglycidyl ether can be used as tetra-functional epoxide.

Mixture B, which comprises isocyanurates only in a preferred embodiment, generally has a viscosity of from 100 to 20,000 mPas. Preferred mixtures B have viscosities in the range from 500 to 15,000 mpas. The particularly preferred mixtures include mixtures having viscosities in the range from 2000 to 6000 mpas. However, also suitable are mixtures having lower viscosities, for example in the range from 500 to 1000. It is furthermore possible to use, for example, mixtures whose viscosities are in the range from 9000 to 13,000. The stated viscosities relate in each case to measurements by the DIN 53 019 method at 23° C.

Besides the isocyanate groups and the functional groups of compounds $b_{12}$ to $b_{42}$, mixtures B may further comprise small amounts of, in general, not more than 5% by weight, based on the total of components $b_1$ to $b_4$, of further compounds having allophanate or uretdione groups.

In general, the mixtures B are prepared by catalytic oligomerization of aliphatic diisocyanates. Suitable catalysts include, for example, hydroxides or organic salts of weak acids with tetraalkylammonium groups, hydroxides or organic salts of weak acids with hydroxyalkylammonium groups, alkali metal salts of tin, zinc or lead salts of alkylcarboxylic acids. It is further possible to use, as catalysts, alkali metal alkoxides and phenoxides, metal salts of carboxylic acids, for example cobalt naphthenate, sodium benzoate, sodium acetate and potassium formate, tertiary amines, for example triethylamine, N,N-dimethylbenzylamine, triethylenediamine, tris-2,4,6-(dimethylaminomethyl)phenol, tris-1,3,5-(dimethylaminopropyl)-S-hexahydrotriazine, tertiary phosphines or tertiary ammonium compounds.

This is accomplished by allowing the aliphatic and/or cycloaliphatic diisocyanates to react in the presence of a catalyst, optionally with the use of solvents and/or assistants, until the desired conversion has been reached. In general, the reaction is carried out at temperatures within the range from 60 to 100° C. Thereafter the reaction is discontinued by deactivation of the catalyst and excess monomeric diisocyanate is distilled off. The catalyst can be deactivated by addition of an aliphatic dicarboxylic acid, eg., oxalic acid or ethylhexanoic acid, or by heating the reaction mixture to temperatures above 100° C. Depending on the catalyst type used and on the reaction temperature, polyisocyanates are obtained that have different proportions of isocyanate and uretdione groups.

Such processes are known per se, for example from DE-A 43 20 821 and 44 05 055.

The products thus prepared are usually clear products which, however, depending on the catalyst type, the diisocyanate grade, the reaction temperature and the reaction procedure have a more or less pronounced yellow color.

The biodegradable polyesters of the invention are branched and, if at all, crosslinked only to a minor extent. The polyesters of the invention generally have a weight average molecular weight Mw within the range from 60,000 to 250,000 g/mol, for example within the range from 70,000 to 200,000 g/mol. Depending on the desired property profile, the molecular weights (weight average Mw) can be for example within the lower range, for example within the range from 60,000 to 140,000, preferably within the range from 80,000 to 110,000, g/mol. However, they can also be in the higher molecular range, for example, in a preferred embodiment, within the range from 180,000 to 200,000 g/mol (weight average Mw). In a further preferred embodiment, the polyesters of the invention have molecular weights (weight average Mw) within the range from 150, 000 to 160,000 g/mol. The molecular weights are determined by gel permeation chromatography (polystyrene standards with narrow distributions and tetrahydrofuran as solvent). Their polydispersity index (PDI=Mw/Mn) is in the range from 2 to 9, preferably 3 to 7.

The biodegradable polyesters according to the invention can be used without other additives or be employed as molding compositions mixed with appropriate additives.

It is possible to add from 0 to 80% by weight of additives, based on the biodegradable polyesters according to the invention. Examples of suitable fillers are carbon black, starch, lignin powder, cellulose fibers, natural fibers such as sisal and hemp, iron oxides, clay minerals, talc, ores, calcium carbonate, calcium sulfate, barium sulfate and titanium dioxide. The additives may also in some cases contain stabilizers such as tocopherol (vitamin E), organic phosphorus compounds, mono-, di- and polyphenols, hydroquinones, diarylamines, thioethers, UV stabilizers, nucleating agents such as talc, and lubricants and mold release agents based on hydrocarbons, fatty alcohols, higher carboxylic acids, metal salts of higher carboxylic acids, such as calcium and zinc stearates, and montan waxes. Stabilizers of these types are described in detail in the Kunststoff-Handbuch, Volume 3/1, Carl Hanser Verlag, Munich, 1992, pages 24 to 28.

The biodegradable polyesters according to the invention may additionally be colored as desired by adding organic or inorganic dyes. The dyes may also be regarded as additives in the widest sense.

Depending on the required application, the biodegradable polyesters according to the invention may be mixed with thermoplastic polymers or other polymers which are themselves biodegradable.

Preferred thermoplastic polymers with which the biodegradable polyesters according to the invention can be processed to give molding compositions are those compatible with the biodegradable polyesters according to the invention. These include in particular polycarbonates, polyacrylates or polymethacrylates, preferably poly(methyl methacrylate) or polyvinyl acetate.

The biodegradable polyesters according to the invention may be processed, for example, with cellulose compounds such as cellulose esters, in particular cellulose alkyl esters, such as cellulose acetate, cellulose propionate, cellulose butyrate or mixed cellulose esters, eg. cellulose acetate butyrate or cellulose propionate butyrate, to give molding compositions.

It is furthermore possible to employ the biodegradable polyesters according to the invention mixed with other polyesters which are themselves biodegradable, for example the linear aliphatic/aromatic copolyesters disclosed in U.S. Pat. No. 5,446,079 or the aliphatic/aromatic polyesters described in DE-A1-44 40 858.

It is furthermore possible to prepare molding compositions which contain the biodegradable polyesters according to the invention plus biodegradable aliphatic polyesters. The biodegradable aliphatic polyesters which can be used as blend component include both linear aliphatic polyesters without chain extensions and those having chain extensions and/or branches. Particularly preferred aliphatic polyesters are those such as polyhydroxybutyrate, copolymers based on polyhydroxybutyrate and polyhydroxyvalerate, poly(hexamethylene glutarate), poly(hexamethylene adipate), poly(butylene adipate), poly(butylene succinate), poly(ethylene adipate), poly(ethylene glutarate), poly(diethylene adipate), poly(diethylene succinate) or poly(hexamethylene succinate). The preferred blend components also include the abovementioned branched aliphatic polyesters with chain extensions disclosed in EP-A1-572 682.

The biodegradable polyesters according to the invention may furthermore be mixed with starch, preferably modified starch, in particular thermoplastic starch or starch compounds such as starch ethers or starch esters.

It is, of course, possible for the molding compositions based on the biodegradable polyesters according to the invention and the thermoplastic or other biodegradable polymers to contain additives such as the abovementioned fillers, dyes, stabilizers or processing aids in the stated amounts. These molding compositions may furthermore, if necessary, contain additives typical of polymer blends, for example compatibilizers.

The biodegradable polyesters can be obtained according to the invention by, in a first step, preparing the polyesters A and, in a second step, reacting from 95 to 99.99, preferably from 97 to 99.95, particularly preferably from 99.0 to 99.90, mol % of the polyesters A with from 0.01 to 5, preferably from 0.02 to 3, particularly preferably from 0.03 to 1.5, mol %, in particular from 0.05 to 1.0 mol % of the mixture B, where the stated mol % is based on the total of components A and B.

Processes for preparing polyesters A are known in principle (Sorensen and Campbell, "Preparative Methods of Polymer Chemistry", Interscience Publishers, Inc., New York, 1961, pages 111 to 127; Encycl. of Polym. Science and Eng., Vol. 12, 2nd Ed., John Wiley & Sons, 1988, pages 1 to 75, Kunststoff-Handbuch, Volume 3/1, Carl Hanser Verlag, Munich, 1992, pages 15 to 23 (preparation of polyesters); WO 92/13019; EP-A 568 593; EP-A 565, 235; EP-A 28,687), so that detailed statements on this are unnecessary.

Thus, for example, it is possible to react dimethyl esters of component $a_1$ with component $a_2$ ("transesterification") at from 160 to 230° C. in the melt under atmospheric pressure, advantageously under an inert gas atmosphere.

It is advantageous to use for preparing the polyester A a molar excess of component $a_2$ relative to component $a_1$, for example up to 2.5-fold, preferably up to 1.7-fold.

When dicarboxylic acids or their anhydrides are used as component $a_1$, esterification thereof with component $a_2$ can take place before, at the same time as or after the transesterification.

In a preferred embodiment, the process for preparing modified polyalkylene terephthalates described in DE-A 23 36 026 is used.

After reaction of components $a_1$ and $a_2$ and if desired $a_3$, as a rule the polycondensation is carried out under reduced pressure or in a stream of inert gas, for example of nitrogen, with further heating at from 180 to 260° C. until the molecular weight is that required.

In order to avoid unwanted degradation and/or side reactions, if required stabilizers can also be added in this stage. Examples of such stabilizers are the phosphorus compounds described in EP-A 13 461, U.S. Pat. No. 4,328, 049 or in B. Fortunato et al., Polymer Vol. 35, No. 18, pages 4006 to 4010, 1994, Butterworth-Heinemann Ltd. These may also in some cases act as deactivators of the catalysts described above. Examples which may be mentioned are: organophosphites, phosphonous acid and phosphorous acid. Examples of compounds which act only as stabilizers and which may be mentioned are: trialkyl phosphites, triphenyl phosphite, trialkyl phosphates, triphenyl phosphate and tocopherol (vitamin E; for example obtainable as Uvinul® 2003AO (BASF)).

Polyester A is normally prepared with the addition of suitable, known catalysts such as metal compounds based on elements such as Ti, Ge, Zn, Fe, Mn, Co, Zr, V, Ir, La, Ce, Li and Ca, preferably organometallic compounds based on these metals, such as salts of organic acids, alkoxides, acetylacetonates and the like, particularly preferably based on zinc, tin and titanium.

When the biodegradable polyesters according to the invention are used for example in the packaging sector, eg. for foodstuffs, it is usually desirable to choose the content of catalyst employed to be as low as possible, and not to employ toxic compounds. In contrast to other heavy metals such as lead, tin, antimony, cadmium, chromium etc., as a rule titanium and zinc compounds are non-toxic ("Sax Toxic Substance Data Book", Shizuo Fujiyama, Maruzen, K. K., 360 S. (quoted in EP-A 565 235), see also Römpp Chemie Lexikon, Vol. 6, Thieme Verlag, Stuttgart, New York, 9th Edition, 1992, pages 4626 to 4633 and 5136 to 5143). Examples which may be mentioned are: dibutoxydiacetoacetoxy-titanium, tetrabutyl orthotitanate and zinc(II) acetate.

The ratio by weight of catalyst to polyester A is normally in the range from 0.01:100 to 3:100, preferably from 0.05:100 to 2:100, it also being possible to employ smaller amounts of highly active titanium compounds, such as 0.0001:100.

The catalyst can be employed right at the start of the reaction, immediately before the removal of the excess dihydroxy compound or else, if required, divided in several portions, during the preparation of the biodegradable polyesters A. It is also possible, if required, to employ different catalysts or else mixtures thereof.

Polyesters A are preferably reacted with mixture B in the melt, it being necessary to take care that, if possible, no side reactions possibly leading to crosslinking or gel formation take place. This is accomplished according to the invention by means of the selected quantitative ranges for mixture B. Similarly, very thorough mixing serves to minimize secondary reactions. In a particular embodiment, the reaction is normally carried out at from 140 to 260, preferably from 180 to 250° C., with the mixture advantageously being added in several portions or continuously.

If required, polyester A can also be reacted with mixture B in the presence of conventional inert solvents such as toluene, methyl ethyl ketone or dimethylformamide (DMF) or mixtures thereof, in which case the reaction temperature is, as a rule, chosen in the range from 80 to 200, preferably from 90 to 150° C.

The reaction with mixture B can be carried out batchwise or continuously, for example in stirred vessels, static mixers or reaction extruders.

It is also possible to employ conventional catalysts known from the prior art (for example those described in EP-A 534,295) for reacting polyester A with mixture B.

Examples which may be mentioned are: tertiary amines such as triethylamine, dimethylcyclohexylamine, N-methylmorpholine, N,N'-dimethylpiperazine, diazabicyclo[2.2.2]octane and the like, and, in particular, organometallic compounds such as titanium compounds, iron compounds, tin compounds, eg. dibutoxy-diacetoacetoxytitanium, tetrabutyl orthotitanate, tin diacetate, dioctoate, dilaurate or the dialkyltin salts of aliphatic carboxylic acids such as dibutyltin diacetate, dibutyltin dilaurate or the like, it again being necessary to take care that, where possible, no toxic compounds are employed.

The biodegradable polyesters according to the invention are very particularly preferably prepared by initially polymerizing the polyester A for example in a vessel or a continuous polycondensation system as described above. The polyester A obtained this way is, without further purification, discharged into a mixing apparatus which permits very thorough mixing of the viscous polyester A and of the low viscosity mixture B. Examples of suitable mixing apparatus are extruders such as reaction extruders which have a metering apparatus, preferably in the first extruder half, in particular the first extruder third, or static mixers. However, it may also be advantageous, before polyester A is transferred into the mixing apparatus such as the static mixer, to purify polyester A in an intermediate step.

Mixture B can be metered in upstream of the mixing element or into component A in the mixing element. In a particularly preferred embodiment, component B is, before introduction of component A into the extruder or the static mixer, continuously fed into the components discharged from the vessel or polymerization system. The two partstreams are homogenized in the static mixer and react at the same time. The melt temperatures in the static mixer are particularly preferably in the range from 190 to 240° C.

The polymer melt is then discharged, for example by a caster or a hole die, and either granulated under water or cooled in a cooling bath and then granulated. However, a belt granulator can also be employed for the granulation step, for example.

The biodegradable polyesters according to the invention, and the molding compositions containing them, can be applied to coating substrates by rolling, painting, spraying or pouring. Preferred coating substrates are those which can be composted or rot, such as moldings of paper, cellulose or starch.

The biodegradable polyesters according to the invention, and the molding compositions, can additionally be used to produce moldings which can be composted. Examples of moldings which may be mentioned are: disposable articles such as dishes, cutlery, refuse sacks, films for agriculture for harvest advancement, or for protection from moisture as underfilms, fango packs or tablecloths, as packaging films and vessels for growing plants or as tire material, disposable coathangers like those required in dry cleaners, as disposable gloves or medical syringes.

Furthermore, the biodegradable polyesters according to the invention, and the molding compositions containing them, can be spun to filaments in a manner known per se. The filaments can, if required, be drawn, draw-twisted, draw-wound, draw-warped, draw-sized and draw-texturized, by conventional methods. The drawing to flat yarn can moreover be carried out in one and the same operation (fully drawn yarn or fully oriented yarn) or in a separate operation. The draw-warping, draw-sizing and draw-texturizing is generally carried out in an operation separate from the spinning. The filaments can be further processed to fibers in a manner known per se. It is then possible to obtain fabrics from the fibers by weaving or knitting. The filaments can be used, for example, for closing disposable articles or for producing dental floss, or tows can be used for cigarette filters; nonwovens are used in the hygiene sector or in the household.

A particular area of application of the biodegradable polyesters according to the invention, and of the molding compositions containing these polyesters, relates to use as compostable film or a compostable coating as outer layer of diapers. The outer layer of the diapers effectively prevents the passing through of liquids absorbed in the interior of the diapers by the fluff and superabsorbents, preferably by biodegradable superabsorbents, for example based on crosslinked polyacrylic acid or crosslinked polyacrylamide. A nonwoven cellulose material can be used as inner layer of the diapers. The outer layer of the described diapers is biodegradable and thus compostable. It decomposes on composting so that the complete diaper rots, whereas diapers provided with an outer layer of, for example, polyethylene cannot be composted without prior reduction in size or elaborate removal of the polyethylene sheet.

Another preferred use of the biodegradable polyesters according to the invention, and of the molding compositions containing these polyesters, relates to production of adhesives in a manner known per se (see, for example, Encycl. of Polym. Sc. and Eng. Vol. 1 "Adhesive Compositions", pages 547 to 577). The polymers and molding compositions according to the invention can also be processed with suitable tackifying thermoplastic resins, preferably natural resins, by methods described in EP-A 21042. The polymers and molding compositions according to the invention can also be further processed to solvent-free adhesive systems such as hot-melt films in a similar way to that disclosed in DE-A 4,234,305. It is moreover possible to produce, for example, plastic films which can be inscribed and which adhere to paper but can be detached again to allow marking of desired places in the text.

Another preferred area of application relates to the production of completely degradable blends with starch mixtures (preferably with thermoplastic starch as described in WO 90/05161) similar to the process described in DE-A 42 37 535. The polymers and thermoplastic molding compositions according to the invention can, according to observations to date, because of their hydrophobic nature, their mechanical properties, their complete biodegradability, their good compatibility with thermoplastic starch and, last but not least, because of their favorable raw materials basis, be advantageously employed as synthetic blend component.

Further areas of application relate, for example, to the use of the biodegradable polyesters according to the invention, and of the molding compositions containing these polyesters, in agricultural mulch, packaging material for seeds, nutrients or flowers, substrate in adhesive films, underpants for babies, handbags, bed films, bottles, boxes, dust bags, labels, cushion covers, protective clothing, hygiene articles, handkerchiefs, toys and wipes.

The biodegradable polyesters according to the invention are distinguished by containing deliberately incorporated branching points but being uncrosslinked and thus remaining thermoplastic and readily degradable under conditions like those prevailing in compost.

The advantages of the biodegradable polyesters according to the invention compared with other known biodegradable polyesters based on aliphatic and aromatic dicarboxylic acids lie in the good surface quality of the moldings or films produced from the polyesters according to the invention or the molding compositions containing them. The surfaces are very substantially free of bits or specks. In addition, they have no defects derived from gel formation. The biodegradable polyesters according to the invention are furthermore suitable for producing films or moldings in conventional molding machines operating with long cycle times. It is possible to produce very thin films at a comparatively low level of aromatic building blocks in the polyester. Furthermore, the biodegradable polyesters of the invention carry their favorable film properties into the blends produced therefrom.

Furthermore, the biodegradable polyesters according to the invention surprisingly display pseudoplasticity, ie. viscosity depending on the rate of shear, which is greater than that of polyesters of corresponding structure and chain length which have branching points and are derived from trifunctional branching agents such as trifunctional alcohols or pure trifunctional isocyanates. The biodegradable polyesters according to the invention therefore have greater mechanical melt stability even with a lower degree of branching than in the case of branching with trifunctional branching agents.

Compared with linear biodegradable polyesters, the breaking extension of the biodegradable polyesters according to the invention is better because it is balanced in the longitudinal and transverse directions. The polyesters of the invention moreover have similar breaking strengths and yield stresses to linear biodegradable polyesters having a comparable level of groups derived from isocyanates while, at the same time, having lower breaking extensions. They are therefore particularly suitable for the production of blown films.

EXAMPLES

The melt volume index was measured in accordance with ISO 1133 under a load of 2.16 kg and at a temperature of 190° C.

The hydroxyl number (OH number) and the acid number (AN) were determined according to the following methods:

(a) Determination of the Apparent Hydroxyl Number

To about 1 to 2 g of accurately weighed-out test substance were added 10 ml of toluene and 9.8 ml of acetylating reagent (see below) and heated at 95° C. for 1 hour with stirring. The reafter 5 ml of distilled water were added. After cooling down to room temperature, 50 ml of tetrahydrofuran (THF) were added and potentiographically titrated with ethanolic KOH standard solution to the turning point.

The run was repeated without test substance (blank sample).

The apparent OH number was then determined on the basis of the following formula:

apparent OH number c.t.56.1.(V2−V1)/m (in mg of KOH/g)

where c=concentration of ethanolic KOH standard solution in mol/l, t=titer of ethanolic KOH standard solution m=weight in mg of test substance V1=consumption of standard solution with test substance in ml V2=consumption of standard solution without test substance in ml.

Reagents used:

ethanolic KOH standard solution, c=0.5 mol/l, titer 0.9933 (Merck, Art. No. 1.09114)

acetic anhydride p.A. (Merck, Art. No. 42)

pyridine p.A. (Riedel de Haen, Art. No. 33638)

acetic acid p.A. (Merck, Art. No. 1.00063)

acetylating reagent: 810 ml of pyridine, 100 ml of acetic anhydride and 9 ml of acetic acid water, deionized THF and toluene (b) Determination of the Acid Number (AN)

About 1 to 1.5 g of test substance were weighed out accurately and admixed with 10 ml of toluene and 10 ml of pyridine and then heated to 95° C. After dissolution, the solution is cooled down to room temperature, admixed with 5 ml of water and 50 ml of THF and titrated with 0.1 N of ethanolic KOH standard solution.

The determination was repeated without test subtance (blank sample).

The acid number was then determined on the basis of the following formula:

$$AN = c.t.56.1.(V1-V2)/m \text{ (in mg of KOH/g)}$$

where
- c=concentration of ethanolic KOH standard solution in mol/l,
- t=titer of ethanolic KOH standard solution
- m=weight in mg of test substance
- V1=consumption of standard solution with test substance in ml
- V2=consumption of standard solution without test substance in ml.

Reagents used:
- ethanolic KOH standard solution, c=0.1 mol/l, titer=0.9913 (Merck, Art. No. 9115)
- pyridine p.A. (Riedel de Haen, Art. No. 33638)
- water, deionized
- THF and toluene (c) Determination of the OH Number The OH number is the sum of the apparent OH number and the AN:

OH number=apparent OH number+AN

The degree of branching (DB [mol %]) is the molar ratio of the branching points to the sum total from the dicarboxylic acids and dihydroxy compounds.

The film thickness was determined by means of an electronic micrometer screw.

Tensile tests were carried out in conformance with ISO 527 to determine the breaking strength ($\sigma_R$ [MPa]), the breaking extension ($\epsilon_R$ [%]) and the yield stress ($\sigma_R$ [MPa]).

|  | Abbreviations: |
| --- | --- |
| DMT: | dimethyl terephthalate |
| Gl: | glycerol |
| HDI: | 1,6-hexamethylene diisocyanate |
| TBOT: | tetrabutyl orthotitanate |
| TP: | trimethylolpropane |

Preparation of Polyesters A1 to A3

Polyester A1

(a') 4672 kg of 1,4-butanediol, 7000 kg of adipic acid and 50 g of tin dioctoate were reacted at from 230 to 240° C. under a nitrogen atmosphere. After most of the water formed in the reaction had been distilled out, 10 g of tetrabutyl orthotitanate (TBOT) were added to the reaction mixture. Once the acid number had fallen below 2, excess 1,4-butanediol was distilled out under reduced pressure until the OH number reached 56.

(a") 1.81 kg of the polyester from a', 1.17 kg of dimethyl terephthalate (DMT), 1.7 kg of 1,4-butanediol and 4.7 g of TBOT were placed in a three-neck flask and heated under a nitrogen atmosphere with slow stirring to 180° C. During this, the methanol formed in the transesterification was distilled out. The mixture was heated over the course of 2 h, while increasing the stirrer speed, to 230° C. and, after a further hour, 2 g of 50% by weight aqueous phosphorous acid were added. The pressure was reduced to 5 mbar over the course of 1 h, and the mixture was maintained at 240° C. under a pressure of less than 2 mbar for various times in order to monitor the degree of polycondensation, during which the excess 1,4-butanediol distilled out.

The polyesters A1 prepared in this way had an acid number of up to 1 mg KOH and an OH number (corr.) of at least 3 mg KOH. The melt flow indices of polyesters A1 are reported in Table 1.

Polyester A2

776.8 g (4.0 mol) of DMT, 1622.2 g of 1,4-butanediol (18 mol) and 0.327 g of TBOT were reacted at from 230 to 240° C. under a nitrogen atmosphere. After most of the methanol formed in the reaction had been distilled out, 876.8 g (6.0 mol) of adipic acid were added, a vacuum was applied and the polycondensation carried on until a melt flow index of 60 cm³/10 min (2.16 kg, 190° C.), an OH number of 5.0 mg of KOH and an acid number of 0.6 mg of KOH was obtained.

Polyester A3

Like polyester A1, except that the condensation was carried on to a melt flow index of 54 cm³/10 min. Polyester A3 had an acid number of 4.5 mg of KOH and an OH number of 0.9 mg of KOH.

Mixture B1

B1 was prepared by oligomerization of HDI in the presence of N,N,N-trimethyl-2-hydroxypropylammonium 2-ethylhexanoate. The decrease in the NCO content of the mixture was monitored. At an NCO content within the range from 40 to 43%, the reaction was discontinued by deactivating the catalyst. The reaction mixture was then distilled.

The composition was determined by gel permeation chromatography.

- 55% by weight of the mononuclear isocyanurate of hexamethylene diisocyanate,
- 20% by weight of the binuclear isocyanurate of hexamethylene diisocyanate,
- 10% by weight of the trinuclear isocyanurate of hexamethylene diisocyanate,
- 15% by weight of the higher-nuclear isocyanurates of hexamethylene diisocyanate, Mixture B1 had a total functionality of 3.7 and a number average molecular weight Mn of 740 g/mol.

Inventive Examples 1 to 5

The amounts of polyester A1 and mixture B1 stated in Table 1 were combined at 210° C. under a nitrogen atmosphere and stirred for a few minutes. The melts were then examined.

Comparative Examples C1 and C2

At the start of step a" in the preparation of polyester A1, the amount of trimethylolpropane (TP) or glycerol (G1) stated in Table 1 was added to the monomers. Otherwise, polyesters C1 and C2 were prepared as described above.

Comparative Example C3

Preparation took place as described under A1. The polyesters A1 were then reacted with 1,6-hexamethylene diisocyanate and glycerol instead of with a mixture B1. The reaction with 1,6-hexamethylene diisocyanate was carried out as described under Examples 1 to 5.

Comparative Examples C4 to C6

The procedure was as described under Examples 1 to 5, except that 1,6-hexamethylene diisocyanate was employed in place of mixture B1.

TABLE 1

| Ex. No. | A1 [mol-%]/MVI [cm³/10 min] | B1 [mol %] | HDI [mol %] | TP [mol %] | Gl [mol %] |
|---|---|---|---|---|---|
| 1 | 99.90/5 | 0.10 | — | — | — |
| 2 | 99.92/14 | 0.08 | — | — | — |
| 3 | 99.72/19 | 0.28 | — | — | — |
| 4 | 99.95/139 | 0.05 | — | — | — |
| 5 | 99.72/58 | 0.28 | — | — | — |
| C1 | 99.72/56 | — | — | 0.28 | — |
| C2 | 99.91/106 | — | — | 0.09 | — |
| C3 | 98.22/155 | — | 0.5 | — | 0.28 |
| C4 | >99.5/3 | — | <0.5 | — | — |
| C5 | >99.5/6 | — | <0.5 | — | — |
| C6 | >99.5/26 | — | <0.5 | — | — |
| C7 | 100/62 | — | — | — | — |
| C8 | 100/155 | — | — | — | — |
| C9 | 100/>250 | — | — | — | — |

FIG. 1 shows the viscosity functions (dynamic viscosities) of the polyesters according to the invention and of the comparative examples measured with oscillatory small-amplitude shear (dynamic stress rheometer DSR with plate-plate geometry, diameter: 25 mm, height: 1 mm) at 140° C. with a shear stress amplitude of 100 Pa.

As is evident from FIG. 1, the effects are most pronounced at shear rates of about 100 rad/s, as typically occur on extrusion of polymer melts.

Inventive Example 6

50 g of polyester A2 were mixed with 0.5 g of mixture B1, which corresponds to an addition of 0.0025 mol of isocyanate groups, at 235° C. under a nitrogen atmosphere. The reaction mixture was stirred in a kneader throughout the reaction time and the increase in stirrer torque was measured (see FIG. 2). The melt volume index was 1.2 cm³/10 min.

Comparative Example C10

Like Inventive Example 6, except that mixture B1 was replaced by 0.2 g of hexamethylene diisocyanate, which likewise corresponds to 0.0025 mol of isocyanate groups. The torque increase trajectory is shown in FIG. 3. The melt volume index was 22.3 cm³/10 min.

The results of these investigations reveal that the polyesters of the invention have a very much higher viscosity than linear polyesters containing the same amount of groups derived from the isocyanates. The polyesters of the invention therefore have a higher melt stability.

Example 7

The melt of polyester A3 was combined onto 0.15 mol % of mixture B1 in a static mixer at 200° C. The resulting polyester of the invention had a melt volume index of 5.3 cm³/10 min.

Comparative Example C11

The melt of polyester A3 was combined with 0.5 mol % of HDI in a static mixer at 200° C. The resulting polyester had an MVI of 5.5 cm³/10 min.

The $\eta^*$ viscosities and the compliances were determined on the melts of polyester A3, of polyester 7 according to the invention and of the polyester which represents the state of the art. The results are reported in Table 2.

The viscosity value $\eta^*$ [Pas] is calculated from the elastic component (G'[Pa]) and the viscous component (G"[Pa]) of the voltage signal which are measured at an oscillatory shearing of the sample at a certain frequency ($\eta^* = \sqrt{(G'^2 + G''^2)}/\omega$). The $\eta^*$ reported in the table is that for G"=1000 Pa. The $\eta^*$ values at different temperatures are a measure of the width of the temperature window within which a polymer is processible, eg. extrudable, under shear stress. The closer together the $\eta^*$ values at the different temperatures, the larger the temperature window.

The compliance $J_e$ [Pa$^{-1}$] provides information about how flowable a polymer is under processing conditions which involve the action of shearing forces, for example in an extruder ($J_e = G'/G''^2$). A high $J_e$ value indicates a flowable polymer and a high attainable throughput.

In terms of equipment, the measurements are carried out by applying each of the vacuum-dried samples at 80° C. to a rotary rheometer (Rheometrics Pyramic Spectrometer from Rheometric Scientific) equipped with a plate/plate measuring insert, melting it and subjecting the melt to an oscillatory measurement at angular frequencies of from 100 to 0.1 rad/s using a constant shear amplitude of 0.5.

The results of the investigations are reported in Table 2.

| Ex. No. | MVI [cm³/10 min] | Temperature [° C.] | $\eta^*$ [Pas] | $J_e$ [Pa$^{-1}$] |
|---|---|---|---|---|
| 7 | 5.3 | 190 | 511 | 9.60E$^{-05}$ |
|   |     | 220 | 266 | 8.62E$^{-05}$ |
|   |     | 250 | 107 | 5.97E$^{-05}$ |
| A3 | 54.1 | 190 | 185 | 1.30E$^{-05}$ |
|    |      | 220 | 85  | 1.22E$^{-05}$ |
|    |      | 250 | 55  | 1.11E$^{-05}$ |
| C11 | 5.5 | 190 | 2215 | 4.60E$^{-05}$ |
|     |     | 220 | 800  | 3.57E$^{-05}$ |
|     |     | 250 | 240  | 1.85E$^{-05}$ |

Example 8 melt of polyester A3 was combined with 0.15 mol % of mixture B1 in a static mixer at 200° C. The resulting polyester according to the invention had an MVI of 14 cm³/10 min.

Example 9

The melt of polyester A3 was combined with 0.3 mol % of mixture B1 in a static mixer at 200° C. The resulting polyester according to the invention had an MVI of 5 cm³/10 min.

Comparative Example C12

The melt of polyester A3 was combined with 0.35 mol % of HDI in a static mixer at 200° C. The resulting polyester had an MVI of 15 cm³/10 min.

Comparative Example C13

The melt of polyester A3 was combined with 0.48 mol % of HDI in a static mixer at 200° C. The resulting polyester had an MVI of 6 cm³/10 min.

Comparative Example C14

110.1 kg of the reaction product (a'), from the preparation of polyester A1, were polycondensed with 87.4 kg of DMT, 117.2 kg of 1,4-butanediol and 0.315 g of TBOT as described under a". The melt was discharged and combined with 0.35 mol % of HDI in a static mixer at 200° C. The resulting polyester had an MVI of 12 cm³/10 min.

Example 10

Like C14, except that the 0.35 mol % of HDI was replaced by 0.3 mol % of mixture B1. The resulting polyester according to the invention had an MVI of 5 cm³/10 min.

Inventive polyesters 8 and 9 and also the polyesters A3 and C12 to C14 were each extruded at from 130 to 135° C. and blown into a film using a blowup ratio of 1:2. Table 3 shows the results of the application tests.

TABLE 3

| Ex. No. | T:A [mol %] | MVI | DB | min. film thickness (µm) | $\sigma_R$ (MPa) | $\epsilon_R$ (%) | $\sigma_s$ (MPa) |
| --- | --- | --- | --- | --- | --- | --- | --- |
| A3 | 40:60 | 56 | 0 | 100<sup>a)</sup> | 14 | 950 | 5.1 |
| 8 | 40:60 | 14 | 0.17 | 15 | 28 | 710 | 7.1 |
| C12 | 40:60 | 15 | 0 | 25<sup>b)</sup> | 24 | 825 | 5.9 |
| 9 | 40:60 | 5 | 0.21 | 15 | 36 | 600 | 7.5 |
| C13 | 40:60 | 6 | 0 | 20<sup>b)</sup> | 34 | 640 | 6.2 |
| C14 | 45:55 | 12 | 0 | 15 | 26 | 760 | 7.2 |
| 10 | 45:55 | 5 | 0.20 | 7 | 42 | 580 | 81 | a) An intact tubular film could not be produced. The measurement was carried out on film pieces b) Films having a thickness of 15 µm could not be produced T: Proportion of units derived from terephthalic acid A: Proportion of units derived from adipic acid, each based on the sum total of T and A.

Polyesters 8, 9 and A3 and also C12 to C13 differ in construction, but have the same stoichiometric composition. The data show that the polyesters of the invention can be processed into thinner films than the comparative polyesters. Compared with polyesters C12 and C13, the polyesters of the invention combine similar breaking strengths and yield stresses with lower breaking extensions.

By means of Comparative Example C14 and Inventive Example 10 it is possible to determine that the polyesters of the invention have similar mechanical properties to corresponding polyesters containing a higher proportion of aromatic units, or have better mechanical properties for the same level of aromatic units.

Biodegradability

Inventive Example 11

The melt of polyester A3 in a static mixer was admixed with 0.3 mol % of mixture B1 at 200° C. The resulting polyester had a melt volume index of 4.7 cm³/10 min.

Comparative Example C15

Like Example 11, except that the melt of polymer A3 was mixed with 0.5 mol % of HDI instead of with 0.3 mol % of mixture B1. The resulting polyester had a melt volume index of 4.4 cm³/10 min.

66 g of polyester 11 and of comparative polyester C15 were separately ground and mixed with 625 g of compost (36% absolute moisture content) and incubated in an incubator at 58° C. for 105 days. The control substance used was microcrystalline cellulose (Avicells from Merck).

The reactor vessels used had perforated bottom plates, through which humidified air was constantly pumped in from below. The compost moisture content was adjusted to 55% absolute. The $CO_2$ concentration resulting from the microbial reaction was measured every hour by IR spectroscopy in the exit air and recorded. The gas flow rate determined at each measurement was used to calculate the amount of $CO_2$ produced per day and the degree of degradation based on the maximum possible theoretical $CO_2$ formation ($ThCo_2$). The measured degrees of degradation of three samples of polyester 11 (PS1, PS2, PS3) and three samples of the control cellulose (KS1, KS2, KS3) are shown in FIG. 4 together with the respective averages (polyester 11: $PSM_w$, cellulose: $KSM_w$).

We claim:

1. Biodegradable polyesters based on
   A) 95–99.99 mol % of at least one polyester containing as monomeric building blocks
      $a_1$) an acid component comprising
         $a_{11}$) 20–95 mol % of at least one aliphatic or cycloaliphatic dicarboxylic acid or its ester-forming derivative and
         $a_{12}$) 5–80 mol % of at least one aromatic dicarboxylic acid or its ester-forming derivative, the proportions of $a_{11}$ and $a_{12}$ being based in each case on the total amount of $a_{11}$ and $a_{12}$, and
      $a_2$) at least one dihydroxy compound or at least one amino alcohol or their mixtures
      and
   B) 0.01–5 mol % of a mixture comprising
      $b_1$) 45 . 80% by weight of at least one mononuclear isocyanurate ($b_{11}$) or at least one compound ($b_{12}$) which contains two functional groups capable of reacting with the end groups of polyester A or mixtures of $b_{11}$ and $b_{12}$,
      $b_2$) 13–25% by weight of at least one binuclear isocyanurate ($b_{21}$) or at least one compound ($b_{22}$) which contains three functional groups capable of reacting with the end groups of polyester A or mixtures of $b_{21}$ and $b_{22}$,
      $b_3$) 5–12% by weight of at least one trinuclear isocyanurate ($b_{31}$) or at least one compound ($b_{32}$) which contains four functional groups capable of reaction with the end groups of polyester A or mixtures of $b_{31}$ and $b_{32}$ and
      $b_4$) 2–18% by weight of at least one tetra- or higher-nuclear isocyanurate ($b_{41}$) or mixtures of different isocyanurates ($b_{41}$).

2. Biodegradable polyesters as claimed in claim 1 based on
   97–99.95 mol % of polyester A and
   0.05–3 mol % of mixture B.

3. Biodegradable polyesters as claimed in claim 1, wherein B is an isocyanurate mixture comprising
   $b_1$) 45–80% by weight of a mononuclear isocyanurate,
   $b_2$) 13–25% by weight of a binuclear isocyanurate,
   $b_3$) 5–12% by weight of a trinuclear isocyanurate and
   $b_4$) 2–18% by weight of tetra- or higher-nuclear isocyanurates or their mixtures.

4. Molding compositions comprising biodegradable polyesters as claimed in claim 1 and, if desired, at least one further thermoplastic polymer or at least one further biodegradable polymer or mixtures thereof.

5. A process for preparing biodegradable polyesters, which comprises, in a first steps polyester A containing as monomeric building blocks
   $a_1$) an acid component comprising
      $a_{11}$) 20–95 mol % of at least one aliphatic or cycloaliphatic dicarboxylic acid or its ester-forming derivative and $a_{12}$) 5–80 mol % of at least one aromatic dicarboxylic acid or its ester-forming derivative, the proportions of $a_{11}$ and $a_{12}$ being based in each case on the total amount of $a_{11}$ and $a_{12}$, and $a_2$) at least one dihydroxy compound or at least one amino alcohol or their mixtures being prepared and, in a second step, being reacted with a mixture B comprising $b_1$) 45–80% by weight of at least one mononuclear isocyanurate ($b_{11}$) or at least one compound ($b_{12}$) which contains two functional groups capable of reacting with the end groups of polyester A or mixtures of $b_{11}$ and $b_{12}$, $b_2$) 13–25% by weight of at least one binuclear isocyanurate ($b_{21}$) or at least one compound ($b_{22}$) which contains three functional groups capable of reaction with the end groups of polyester A or mixtures of $b_{21}$ and $b_{22}$, $b_3$) 5–12% by weight of at least one trinuclear isocyanurate ($b_{31}$) or at least one compound ($b_{32}$) which contains four functional groups capable of reaction with the end groups of polyester A or mixtures of $b_{31}$ and $b_{32}$ and $b_4$) 2–18% by weight of at least one tetra- or higher-nuclear isocyanurate ($b_{41}$) or mixtures of different isocyanurates ($b_{41}$), from 95 to 99.9 mol % of polyester A and from 0.01 to 5 mol % of mixture B being reacted with one another.

6. A process as claimed in claim 5, wherein from 97 to 99.95 mol % of polyester A are reacted with from 0.05 to 3 mol % of mixture B.

7. A process as claimed in claim 5, wherein mixture B is an isocyanurate mixture comprising $b_1$) 45–80% by weight of a mononuclear isocyanurate, $b_2$) 13–25% by weight of a binuclear isocyanurate, $b_3$) 5–12% by weight of a trinuclear isocyanurate and $b_4$) 2–18% by weight of tetra- or higher-nuclear isocyanurates or their mixtures.

8. A process as claimed in claim 5, wherein the reaction of polyester A with mixture B is carried out in a static mixer.

9. Moldings, films, fibers or coatings obtainable from the biodegradable polyesters of claim 1.

* * * * *

UNITED STATES PATENT AND TRADEMARK OFFICE
CERTIFICATE OF CORRECTION

PATENT NO.: 6,120,895

DATED: September 19, 2000

INVENTOR(S): KOWITZ et al.

It is certified that error appears in the above-identified patent and that said Letters Patent is hereby corrected as shown below:

On the cover page, item [87], "Mar. 20, 1998" should be --Mar. 26, 1998--.

In the abstract, last line, "filsm" should be --films--.

Col. 18, claim 1, line 28, "45 . 80%" should be --45 - 80%--.

Signed and Sealed this

Twenty-fourth Day of April, 2001

Attest:

NICHOLAS P. GODICI

*Attesting Officer*    *Acting Director of the United States Patent and Trademark Office*